(12) United States Patent
Burd et al.

(10) Patent No.: US 12,215,628 B2
(45) Date of Patent: Feb. 4, 2025

(54) AIRCRAFT SYSTEM WITH GAS TURBINE ENGINE POWERED COMPRESSOR

(71) Applicant: Raytheon Technologies Corporation, Farmington, CT (US)

(72) Inventors: Steven W. Burd, Cheshire, CT (US); Christopher A. Eckett, Simsbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/091,860

(22) Filed: Dec. 30, 2022

(65) Prior Publication Data
US 2024/0026827 A1 Jan. 25, 2024

Related U.S. Application Data

(60) Provisional application No. 63/391,470, filed on Jul. 22, 2022.

(51) Int. Cl.
| | |
|---|---|
| *F02C 7/32* | (2006.01) |
| *F02C 3/073* | (2006.01) |
| *F02C 3/10* | (2006.01) |
| *F02C 3/113* | (2006.01) |
| *F02C 3/14* | (2006.01) |

(Continued)

(52) U.S. Cl.
CPC ............... *F02C 7/32* (2013.01); *F02C 3/073* (2013.01); *F02C 3/113* (2013.01); *F02C 3/14* (2013.01);

(Continued)

(58) Field of Classification Search
CPC .. F02C 7/32; F02C 3/073; F02C 3/113; F02C 3/14; F02C 6/18; F02C 7/36; F02C 6/08;
(Continued)

(56) References Cited

U.S. PATENT DOCUMENTS

| 3,489,377 A | * | 1/1970 | Wright | ................... F02K 1/827 |
| | | | | 137/15.1 |
| 4,900,231 A | * | 2/1990 | Kennedy | ................ B64D 41/00 |
| | | | | 417/16 |

(Continued)

FOREIGN PATENT DOCUMENTS

| GB | 905534 A | * | 9/1962 |
| WO | 2022091275 A1 | | 5/2022 |

OTHER PUBLICATIONS

EP Search Report for EP Patent Application No. 23187374.6 dated Jan. 3, 2024.

*Primary Examiner* — Eric J Zamora Alvarez
(74) *Attorney, Agent, or Firm* — Getz Balich LLC (57) ABSTRACT

An aircraft system is provided that includes a gas turbine engine, a gearbox and at least one compressor. The gas turbine engine includes a compressor section, a turbine section, a combustor section and a rotating structure. The combustor section is fluidly coupled with and between the compressor section and the turbine section. The rotating structure includes a compressor section rotor within the compressor section and a turbine section rotor within the turbine section. The at least one compressor includes a compressor rotor rotatably driven by the rotating structure through the gearbox. The gas turbine engine may be dedicated to powering the at least one compressor.

19 Claims, 7 Drawing Sheets

(51) Int. Cl.
  *F02C 6/18* (2006.01)
  *F02C 6/20* (2006.01)
  *F02C 7/36* (2006.01)
  *F02K 3/06* (2006.01)

(52) U.S. Cl.
  CPC .......... *F02C 6/18* (2013.01); *F05D 2220/323* (2013.01); *F05D 2220/50* (2013.01)

(58) Field of Classification Search
  CPC .... F02C 3/04; F02C 3/10; F02C 3/107; F02C 6/206; F05D 2260/40311; F05D 2220/50; F05D 2220/323; F05D 2240/60; F05D 2260/213; F05D 2240/40; F05D 2220/3218; B64D 13/00; B64D 2013/0611; F04D 29/321; F04D 25/028; F01D 15/12; F01D 13/003; F05B 2220/50; F02K 3/06
  See application file for complete search history.

(56) References Cited

U.S. PATENT DOCUMENTS

| | | | |
|---|---|---|---|
| 5,218,877 A * | 6/1993 | Fukushima | F16H 15/38 |
| | | | 476/40 |
| 9,555,752 B2 * | 1/2017 | Haillot | F02C 7/32 |
| 2013/0097992 A1 | 4/2013 | Suciu | |
| 2014/0084677 A1 | 3/2014 | Haillot | |
| 2016/0069264 A1 * | 3/2016 | Brostmeyer | F02C 7/143 |
| | | | 60/726 |
| 2016/0332736 A1 | 11/2016 | Parmentier | |
| 2017/0284408 A1 * | 10/2017 | Ricordeau | F04D 27/004 |
| 2018/0163627 A1 * | 6/2018 | Suciu | F02C 9/18 |
| 2020/0400077 A1 | 12/2020 | Redford | |
| 2021/0061476 A1 * | 3/2021 | Van Den Ende | F02C 7/18 |
| 2022/0018262 A1 | 1/2022 | Brinson | |
| 2022/0397062 A1 * | 12/2022 | Terwilliger | F02C 7/143 |

* cited by examiner

AIRCRAFT SYSTEM WITH GAS TURBINE ENGINE POWERED COMPRESSOR

CROSS-REFERENCE TO RELATED APPLICATIONS

This application claims priority to U.S. Provisional Patent Application No. 63/391,470 filed Jul. 22, 2022, which is hereby incorporated herein by reference in its entirety.

BACKGROUND OF THE DISCLOSURE

1. Technical Field

This disclosure relates generally to an aircraft and, more particularly, to a powerplant for the aircraft.

2. Background Information

Various types and configurations of aircraft powerplants are known in the art. While these known aircraft powerplants have various benefits, there is still room in the art for improvement. There is a need in the art, in particular, for an aircraft powerplant with improved efficiency and/or tunability.

SUMMARY OF THE DISCLOSURE

According to an aspect of the present disclosure, an aircraft system is provided that includes a gas turbine engine, a gearbox and at least one compressor. The gas turbine engine includes a compressor section, a turbine section, a combustor section and a rotating structure. The combustor section is fluidly coupled with and between the compressor section and the turbine section. The rotating structure includes a compressor section rotor within the compressor section and a turbine section rotor within the turbine section. The at least one compressor includes a compressor rotor rotatably driven by the rotating structure through the gearbox. The gas turbine engine may be dedicated to powering the at least one compressor.

According to another aspect of the present disclosure, another aircraft system is provided that includes a gas turbine engine, a gearbox, a first compressor and a second compressor. The gas turbine engine includes a compressor section, a turbine section, a combustor section and a rotating structure. The combustor section is fluidly coupled with and between the compressor section and the turbine section. The rotating structure includes a compressor section rotor within the compressor section and a turbine section rotor within the turbine section. The first compressor includes a first compressor rotor rotatably driven by the rotating structure through the gearbox. The second compressor includes a second compressor rotor rotatably driven by the rotating structure through the gearbox.

According to still another aspect of the present disclosure, another aircraft system is provided that includes a gas turbine engine, a gearbox, a compressor and a fluid circuit. The gas turbine engine includes a compressor section, a combustor section, a turbine section, a rotating structure and an engine flowpath. The rotating structure includes a compressor section rotor within the compressor section and a turbine section rotor within the turbine section. The engine flowpath extends sequentially through the compressor section, the combustor section and the turbine section. The compressor includes a compressor rotor rotatably driven by the rotating structure through the gearbox. The fluid circuit includes a heat exchanger arranged with the engine flowpath downstream of the turbine section.

The aircraft system may also include a driven rotor outside of the gas turbine engine and the compressor. The driven rotor may be rotatably driven by the rotating structure through the gearbox.

The gas turbine engine may not power an electric generator.

The gearbox may be configured as a constant speed transmission between the rotating structure and the compressor rotor.

The gearbox may be configured as a variable speed transmission between the rotating structure and the compressor rotor.

An engine flowpath may extend sequentially through the compressor section, the combustor section and the turbine section. A compressor flowpath may extend through the at least one compressor. The compressor flowpath may be discrete from the engine flowpath.

The aircraft system may also include a driven rotor rotatably driven by the rotating structure through the gearbox.

The driven rotor may be rotatably driven by the rotating structure through the gearbox independent of the compressor rotor. The compressor rotor may be rotatably driven by the rotating structure through the gearbox independent of the driven rotor.

The driven rotor may be configured as or otherwise include a propulsor rotor.

The aircraft system may also include an electric generator which includes the driven rotor.

The aircraft system may also include a second compressor. The second compressor may include a second compressor rotor rotatably driven by the rotating structure through the gearbox.

The second compressor rotor may be rotatably driven by the rotating structure through the gearbox independent of the compressor rotor. The compressor rotor may be rotatably driven by the rotating structure through the gearbox independent of the second compressor rotor.

An engine flowpath may extend sequentially through the compressor section, the combustor section and the turbine section. A compressor flowpath may extend through the compressor and may be discrete from the engine flowpath. The second compressor flowpath may extend through the second compressor and may be discrete from the engine flowpath.

The aircraft system may also include a heat recovery circuit including a first heat exchanger, a turbine expander, a second heat exchanger and a recovery circuit compressor. The first heat exchanger may be arranged downstream of the turbine section.

The aircraft system may also include a driven rotor rotatably driven by a rotor of the turbine expander.

The aircraft system may also include a fuel circuit including a fuel source, a heat exchanger and a fuel injector. The heat exchanger may be arranged downstream of the turbine section. The heat exchanger may be fluidly coupled between the fuel source and the fuel injector. The fuel injector may be arranged within the combustor section.

The aircraft system may also include a heat exchanger including a first heat exchanger path and a second heat exchanger path. The first heat exchanger path may be fluidly coupled between the compressor section and the combustor section. The second heat exchange path may be fluidly coupled with and downstream of the turbine section.

The gas turbine engine and/or the at least one compressor may be configured for operation throughout aircraft flight.

The gas turbine engine and the at least one compressor may be configured to receive air from discrete (e.g., separate and distinct) inlets.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
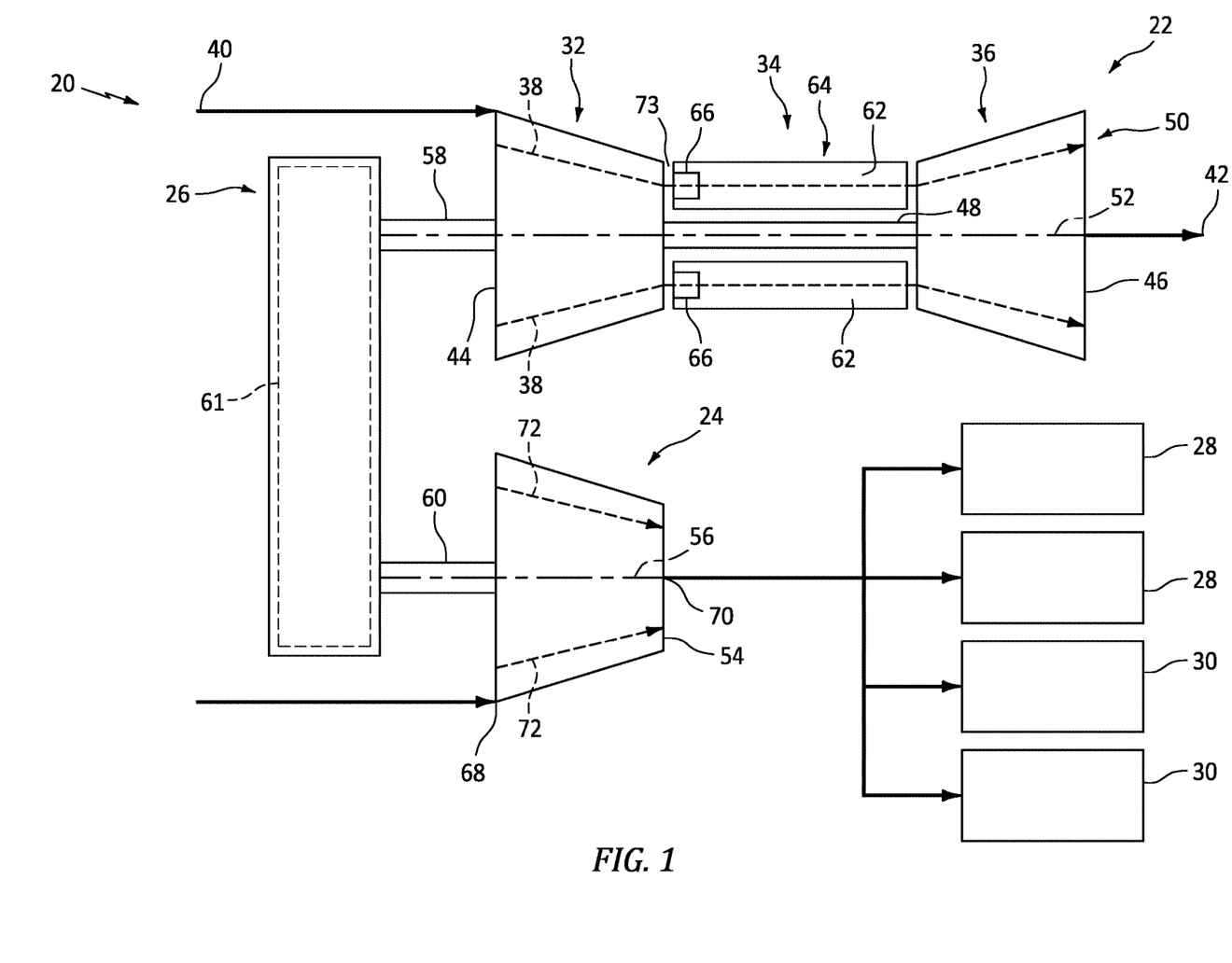
FIG. 1 is a schematic illustration of an aircraft system with a compressor powered by a gas turbine engine.

FIG. 1 illustrates a system 20 for an aircraft. This aircraft may be an airplane, a helicopter, a drone (e.g., an unmanned aerial vehicle (UAV)), a spacecraft or any other manned or unmanned aerial vehicle. The aircraft system 20 of FIG. 1 includes a gas turbine engine 22, an external compressor 24 and a gearbox 26. Herein, the term "external" may describe a component separate from, outside of and/or otherwise discrete from the gas turbine engine 22. The aircraft system 20 of FIG. 1 also includes one or more fluid components 28 and/or one or more nozzles 30.

The gas turbine engine 22 of FIG. 1 includes at least (or only) a compressor section 32, a combustor section 34, a turbine section 36 and an (e.g., annular) internal engine flowpath 38. The engine flowpath 38 extends from an upstream airflow inlet 40 into the gas turbine engine 22, sequentially through the compressor section 32, the combustor section 34 and the turbine section 36, to a combustion products exhaust 42 from the gas turbine engine 22.

The combustor section 34 and the turbine section 36 each include a respective bladed rotor 44 and 46. Each of these bladed rotors 44, 46 includes a plurality of rotor blades distributed circumferentially around and connected to one or more respective rotor disks and/or hubs. The rotor blades, for example, may be formed integral with or mechanically fastened, welded, brazed, adhered and/or otherwise attached to the respective rotor disk(s) and/or hub(s).

The compressor section rotor 44 is connected to the turbine section rotor 46 through an engine shaft 48. The compressor section rotor 44, the turbine section rotor 46 and the engine shaft 48 collectively form or are otherwise included in an internal rotating structure 50 of the gas turbine engine 22. This rotating structure 50 and its elements 44, 46 and 48 are rotatable about an engine rotational axis 52, which engine rotational axis 52 may also be an axial centerline of the gas turbine engine 22.

The external compressor 24 may be configured as or otherwise include an axial flow compressor, a (e.g., one piece rotor assembly) centrifugal flow compressor or a combination of an axial flow and a centrifugal flow compressor. This external compressor 24 may be a single stage compressor or a multi-stage compressor. The external compressor 24 of FIG. 1 includes a bladed compressor rotor 54 rotatable about a compressor rotational axis 56, which compressor rotational axis 56 may also be an axial centerline of the external compressor 24. The compressor rotational axis 56 may be parallel with, but laterally offset from/laterally spaced from, the engine rotational axis 52. Of course, in other embodiments, the compressor rotational axis 56 may alternatively be angularly offset from the engine rotational axis 52 by an angle greater than zero degrees (0°) and less than one-hundred and eighty degrees (180°). The compressor rotor 54 includes a plurality of compressor blades distributed circumferentially around and connected to one or more respective disks and/or hubs. The compressor blades, for example, may be formed integral with or mechanically fastened, welded, brazed, adhered and/or otherwise attached to the respective disk(s) and/or hub(s).

The gearbox 26 operatively couples the rotating structure 50 to the compressor rotor 54. The gearbox 26 of FIG. 1, for example, includes a gearbox input 58 (e.g., a shaft, a gear, a coupling, etc.) and a gearbox output 60 (e.g., a shaft, a gear, a coupling, etc.). The gearbox input 58 is coupled to and rotatable with the rotating structure 50. The gearbox output 60 is coupled to and rotatable with the compressor rotor 54. The gearbox output 60 is also coupled to the gearbox input 58 through an internal power transmission system 61 within the gearbox 26; e.g., a gear system, etc.

The gearbox 26 may be configured as a constant speed transmission. With such a configuration, a ratio between an input speed into the gearbox 26 (e.g., a rotational speed of the gearbox input 58, a rotational speed of the rotating structure 50) and an output speed from the gearbox 26 (e.g., a rotational speed of the gearbox output 60, a rotational speed of the compressor rotor 54) remains constant. The gearbox 26, however, may alternatively be configured as a variable speed transmission. With such a configuration, the ratio between the gearbox input speed and the gearbox output speed may change; e.g., selectively go up or down.

During operation of the aircraft system 20, (e.g., outside, ambient) air enters the gas turbine engine 22 and its engine flowpath 38 through the airflow inlet 40. This air is compressed by the compressor section rotor 44 and directed into a (e.g., annular) combustion chamber 62 of a combustor 64 in the combustor section 34. Fuel is injected into the combustion chamber 62 by one or more fuel injectors 66, and the fuel is mixed with the compressed air to provide a fuel-air mixture. The fuel-air mixture is ignited and combustion products thereof flow through and cause the turbine section rotor 46 to rotate. The rotation of the turbine section rotor 46 drives rotation of the compressor section rotor 44 and, thus, compression of the air received from the airflow inlet 40. The rotation of the turbine section rotor 46 and, more generally, rotation of the rotating structure 50 also drives rotation of the compressor rotor 54 through the gearbox 26. The rotation of the compressor rotor 54 compresses (e.g., outside, ambient) air entering the external compressor 24 through an inlet 68 into the external compressor 24. This compressed air is directed out of the external compressor 24 through an outlet 70 from the external compressor 24 and provided to the fluid component(s) 28 to facilitate operation of the fluid component(s) 28. Examples of the fluid component(s) 28 include, but are not limited to, downstream flow device(s), fluid control device(s), flow conversion component(s) or nozzle(s) configured for providing thrust and/or aerodynamic aircraft controls, aircraft surface(s) and aircraft wing(s).

With the arrangement of FIG. 1, the external compressor 24 is disposed outside of the gas turbine engine 22 and its engine flowpath 38. Moreover, a compressor flowpath 72 through the external compressor 24 from the compressor inlet 68 to the compressor outlet 70 is discrete (e.g., fluidly decoupled from, parallel with, etc.) the engine flowpath 38. The compressed air discharged from the external compressor 24 and provided to the fluid component(s) 28 and/or the nozzle(s) 30 may thereby be relatively cool, compared to the combustion products discharged from the gas turbine engine 22. Furthermore, the external compressor 24 and its compressor rotor 54 may be specifically tailored for (e.g., optimally) providing the compressed air to the fluid component(s) 28 and/or the nozzle(s) 30, whereas the compressor section 32 and its compressor section rotor 44 may be specifically tailored for (e.g., optimally) providing the compressed air to the combustor section 34 for combustion. The external compressor 24 and the compressor section 32 of the aircraft system 20 may thereby be more efficient than a single compressor providing compressed air to both a combustion section of a gas turbine engine and other components outside of that gas turbine engine.

In some embodiments, the aircraft system 20 may include a single external compressor 24 coupled to the gas turbine engine 22 through the gearbox 26. In other embodiments, referring to FIG. 2, the external compressor 24 may be one of a plurality of external compressors 24 (e.g., 24A and 24B) coupled to the gas turbine engine 22 through the gearbox 26. These external compressors 24 may have a common configuration. Alternatively, at least one of the external compressors 24 may be configured (e.g., sized, etc.) different than another one of the external compressors 24. Furthermore, the external compressors 24A and 24B may be individually coupled to the gas turbine engine 22 via the gearbox 26. The compressor rotor 54A, for example, may be rotatably driven by the rotating structure 50 through the gearbox 26 independent of the compressor rotor 54B. In addition, the compressor rotor 54B may be rotatably driven by the rotating structure 50 through the gearbox 26 independent of the compressor rotor 54A. However, the present disclosure is not limited to such an exemplary parallel arrangement.

Figure 2:
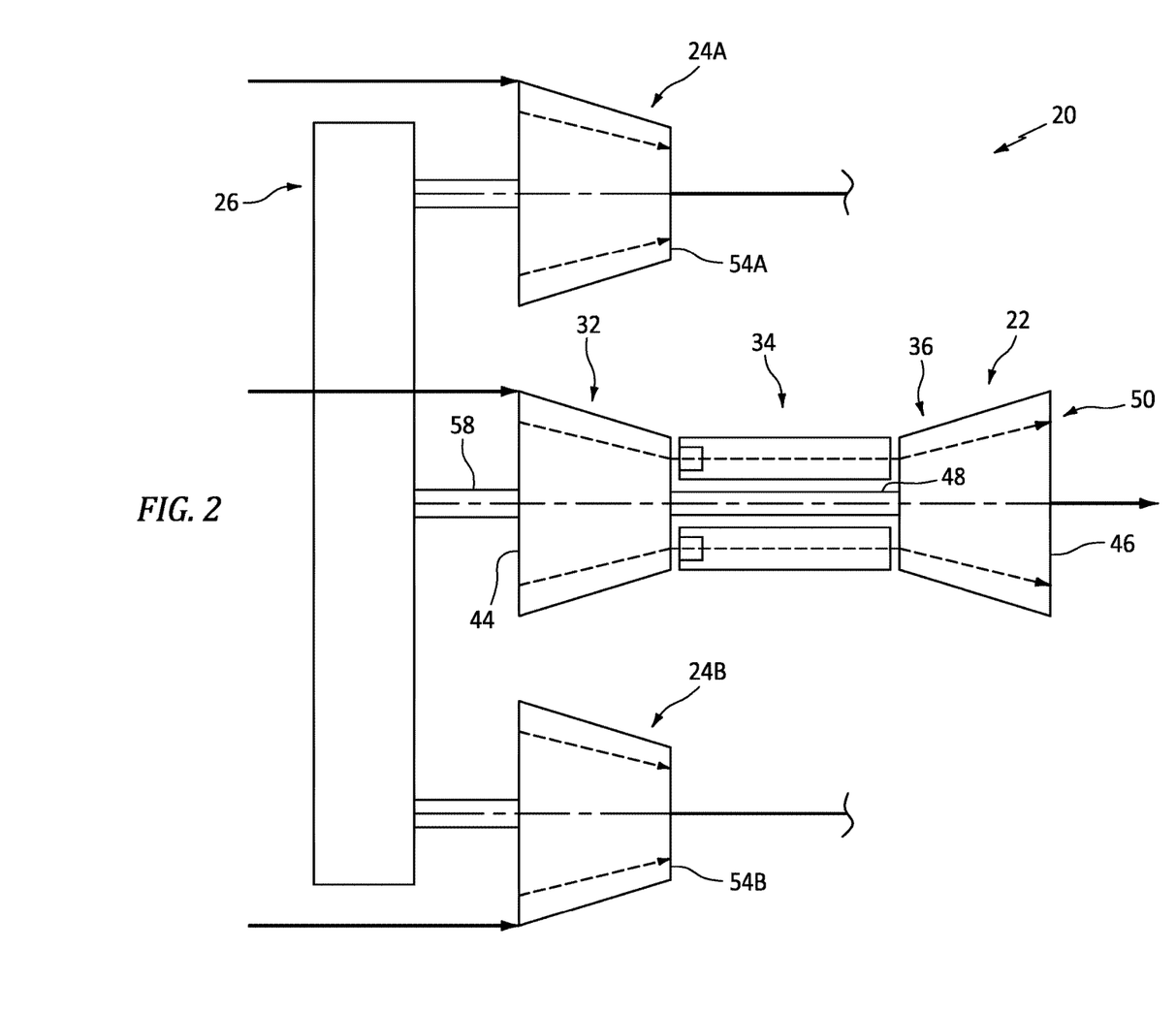
FIG. 2 is a partial schematic illustration of the aircraft system with multiple compressors powered by the gas turbine engine.
Figure 3:
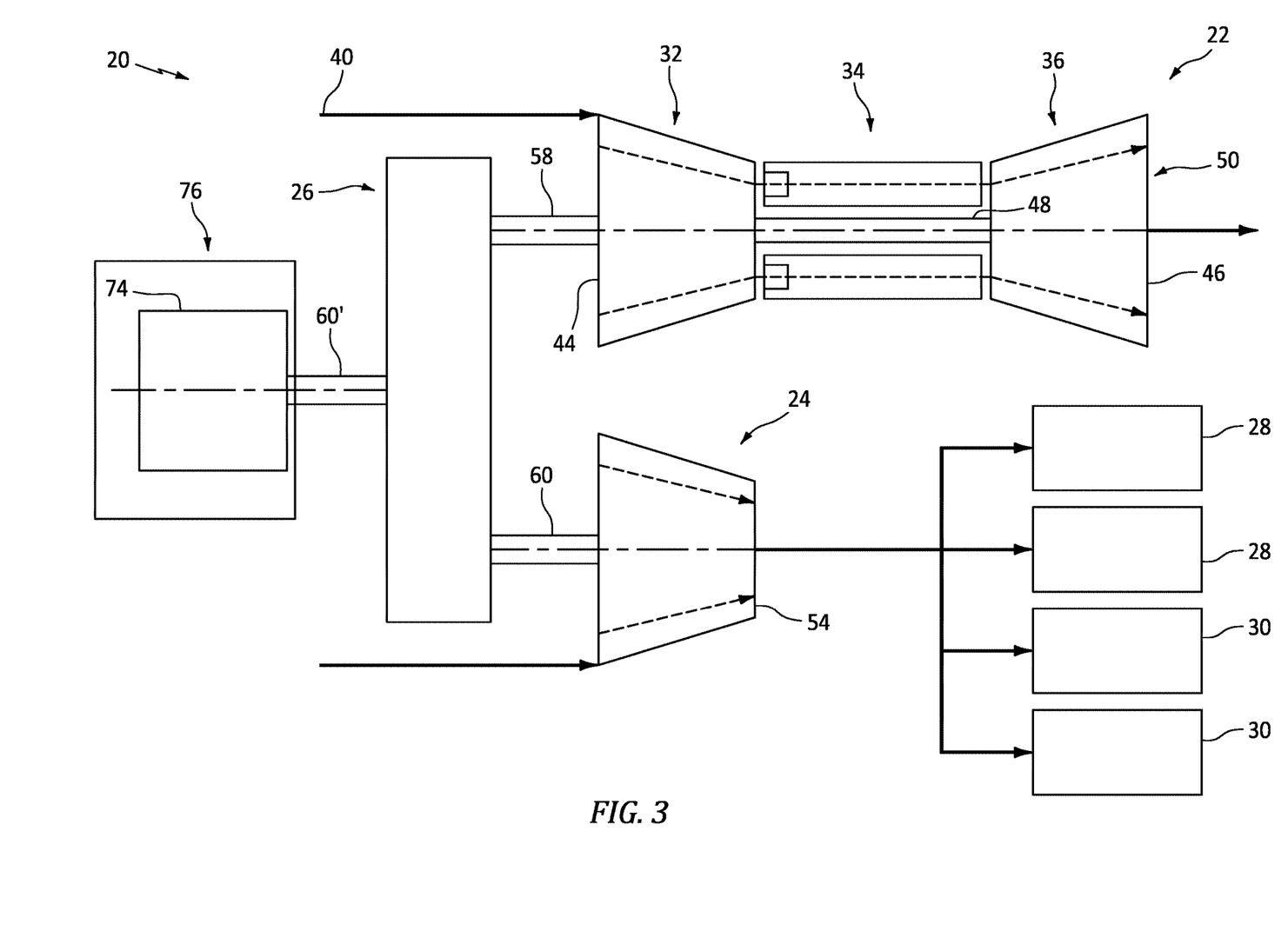
FIGS. 3 and 4 are schematic illustrations of the aircraft system with various mechanical loads also powered by the gas turbine engine.
Figure 4:
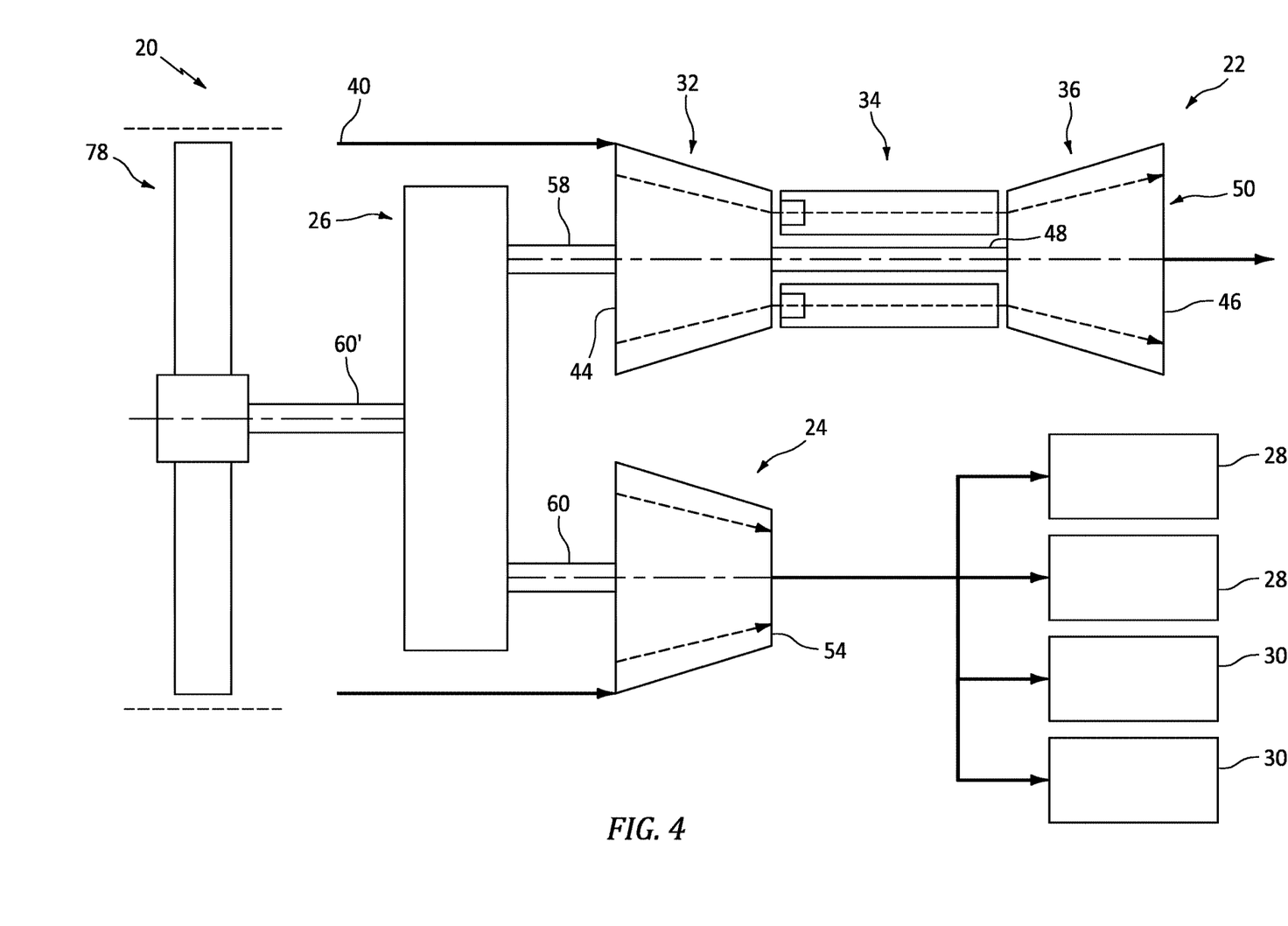

In some embodiments, referring to FIGS. 1 and 2, the gas turbine engine 22 may be dedicated to powering the external compressor(s) 24. The gas turbine engine 22, for example, may not be configured to power any other aircraft components (e.g., propulsor, generator, etc.) and/or provide (e.g., significant or any) aircraft thrust. In other embodiments, however, the combustion products exhausted from the gas turbine engine 22 may be utilized to provide aircraft thrust; e.g., the gas turbine engine 22 may be a turbojet gas turbine engine 22. In addition or alternatively, referring to FIGS. 3 and 4, the gas turbine engine 22 and its rotating structure 50 may be configured to drive rotation of at least (or only) one additional component through the gearbox 26. The gearbox 26 of FIG. 3, for example, includes a second gearbox output 60' that is coupled to and rotatable with a driven rotor 74 within an electric generator 76. In another example, referring to FIG. 4, the second gearbox output 60 is coupled to and rotatable with a driven rotor of an aircraft propulsor; e.g., a bladed propulsor rotor 78. The propulsor rotor 78 may be configured as or otherwise include an open propulsor rotor such as, but not limited to, a propeller or a helicopter rotor (e.g., a main rotor). The propulsor rotor 78 may alternatively be configured as or otherwise include a ducted propulsor rotor such as, but not limited to, a fan rotor. The compressor rotor 54 of FIGS. 3 and 4 may be rotatably driven by the rotating structure 50 through the gearbox 26 independent of the driven rotor 74, 78. In addition, the driven rotor 74, 78 of FIGS. 3 and 4 may be rotatably driven by the rotating structure 50 through the gearbox 26 independent of the compressor rotor 54. However, the present disclosure is not limited to such an exemplary parallel arrangement.

Figure 5:
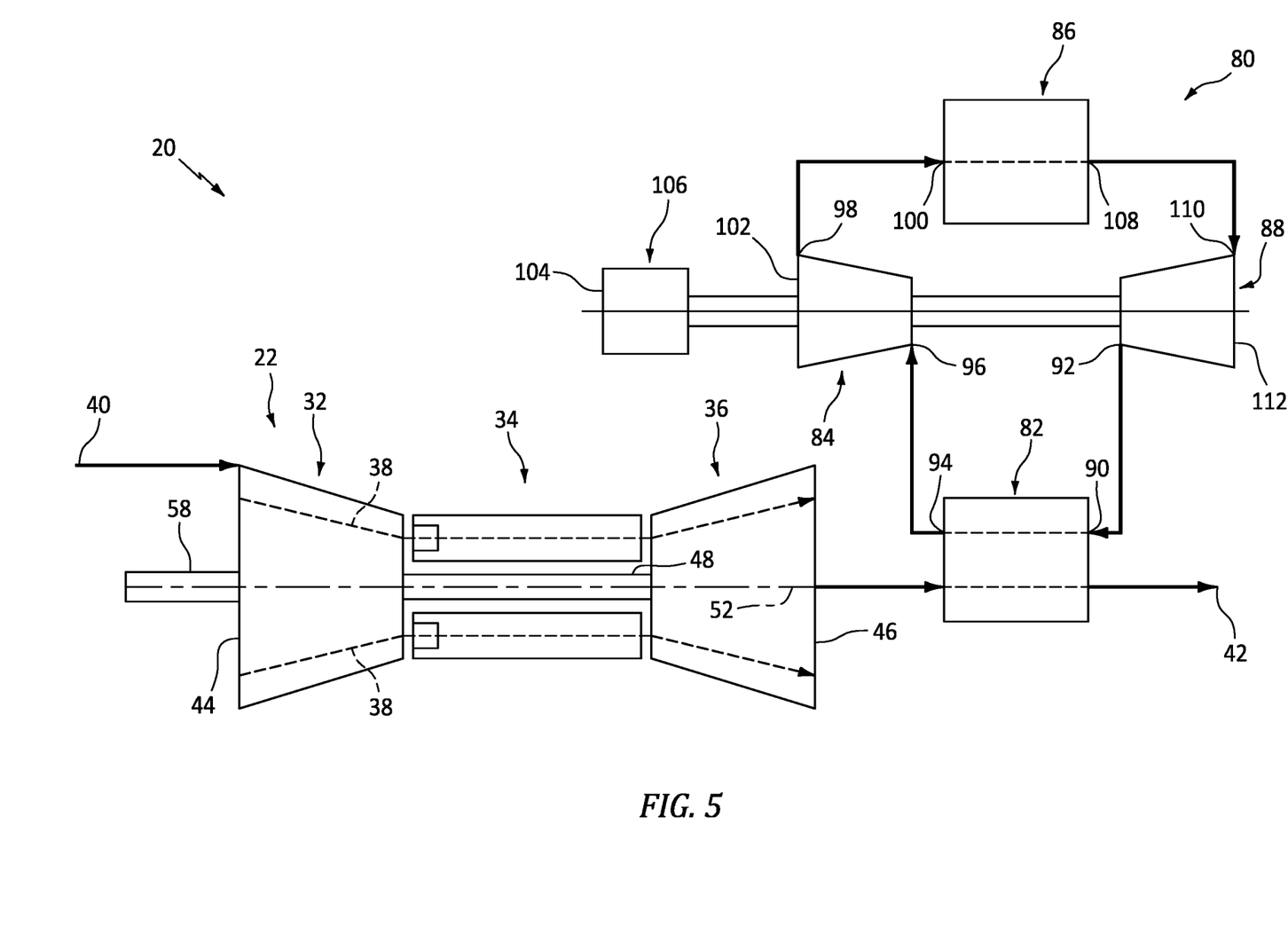
FIG. 5 is a partial schematic illustration of the aircraft system and its gas turbine engine with a heat recovery circuit.

In some embodiments, referring to FIG. 5, the gas turbine engine 22 may be configured with a heat recovery circuit 80. This heat recovery circuit 80 of FIG. 5 includes a first heat exchanger 82, a turbine expander 84 (also referred to as a turboexpander), a second heat exchanger 86 and a recovery circuit compressor 88. The first heat exchanger 82 is arranged with the engine flowpath 38 downstream of the turbine section 36. The first heat exchanger 82 includes an inlet 90 fluidly coupled with and downstream of an outlet 92 from the recovery circuit compressor 88. The first heat exchanger 82 also includes an outlet 94 fluidly coupled with and upstream of an inlet 96 to the turbine expander 84. The turbine expander 84 includes its inlet 96 and an outlet 98 fluidly coupled with and upstream of an inlet 100 to the second heat exchanger 86. The turbine expander 84 also includes a bladed turbine expander rotor 102 configured to drive rotation of a driven rotor 104 of a mechanical load 106. This mechanical load 106 may be an electric generator, a bladed propulsor rotor or another device. The second heat exchanger 86 includes its inlet 100 and an outlet 108 fluidly coupled with and upstream of an inlet 110 to the recovery circuit compressor 88. The recovery circuit compressor 88 includes its outlet 92, its inlet 110 and a bladed compressor rotor 112, where the compressor rotor 112 may be coupled to and rotatably driven by the turbine expander rotor 102 (or another device).

During operation of the heat recovery circuit 80, fluid (e.g., refrigerant) is pressurized and directed through the first heat exchanger 82 by the recovery circuit compressor 88. This pressurized fluid absorbs heat energy from the combustion products exhausted from the turbine section 36 through the first heat exchanger 82. The heated and pressurized fluid flows through the turbine expander 84 and drives rotation of the turbine expander rotor 102. The fluid output from the turbine expander 84 is condensed by the second heat exchanger 86 before flowing into the recovery circuit compressor 88. The rotation of the turbine expander rotor 102 may drive rotation of the compressor rotor 112 and/or the driven rotor 104. The heat recovery circuit 80 may thereby capture waste heat energy exhausted with the combustion products from the gas turbine engine 22 and use that captured energy to power the mechanical load 106.

Figure 6:
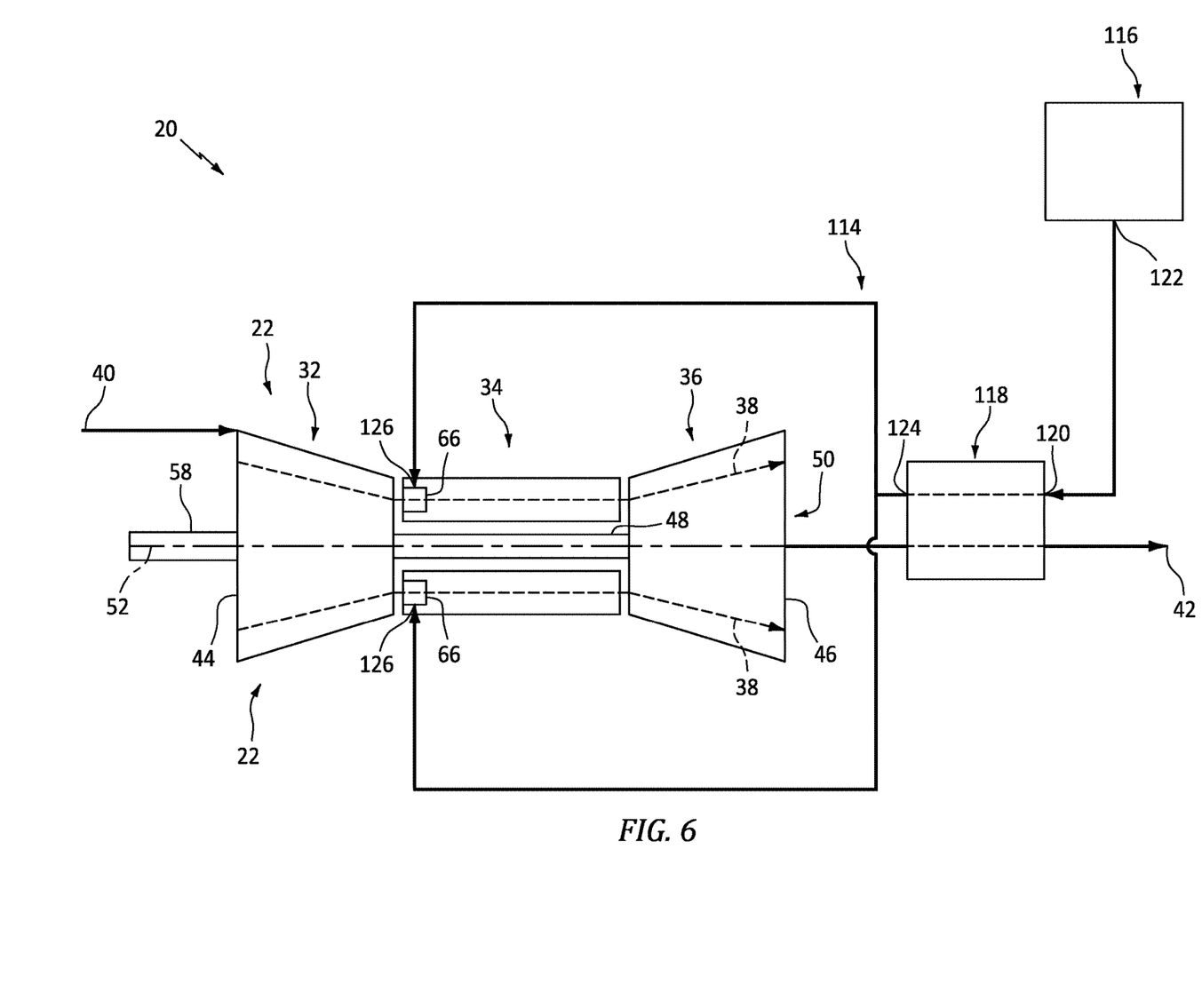
FIG. 6 is a partial schematic illustration of the aircraft system and its gas turbine engine with a fuel circuit.

In some embodiments, referring to FIG. 6, the gas turbine engine 22 may be configured with a fuel circuit 114. This fuel circuit 114 includes a fuel source 116 (e.g., a fuel reservoir and/or a fuel pump), a heat exchanger 118 and the fuel injector(s) 66. The heat exchanger 118 is arranged with the engine flowpath 38 downstream of the turbine section 36. The heat exchanger 118 includes an inlet 120 fluidly coupled with and downstream of an outlet 122 from the fuel source 116. The heat exchanger 118 also includes an outlet 124 fluidly coupled with and upstream of inlet(s) 126 to the fuel injector(s) 66. With this arrangement, the heat exchanger 118 may pre-heat the fuel provided to the fuel injector(s) 66 to facilitate more efficient combustion.

Figure 7:
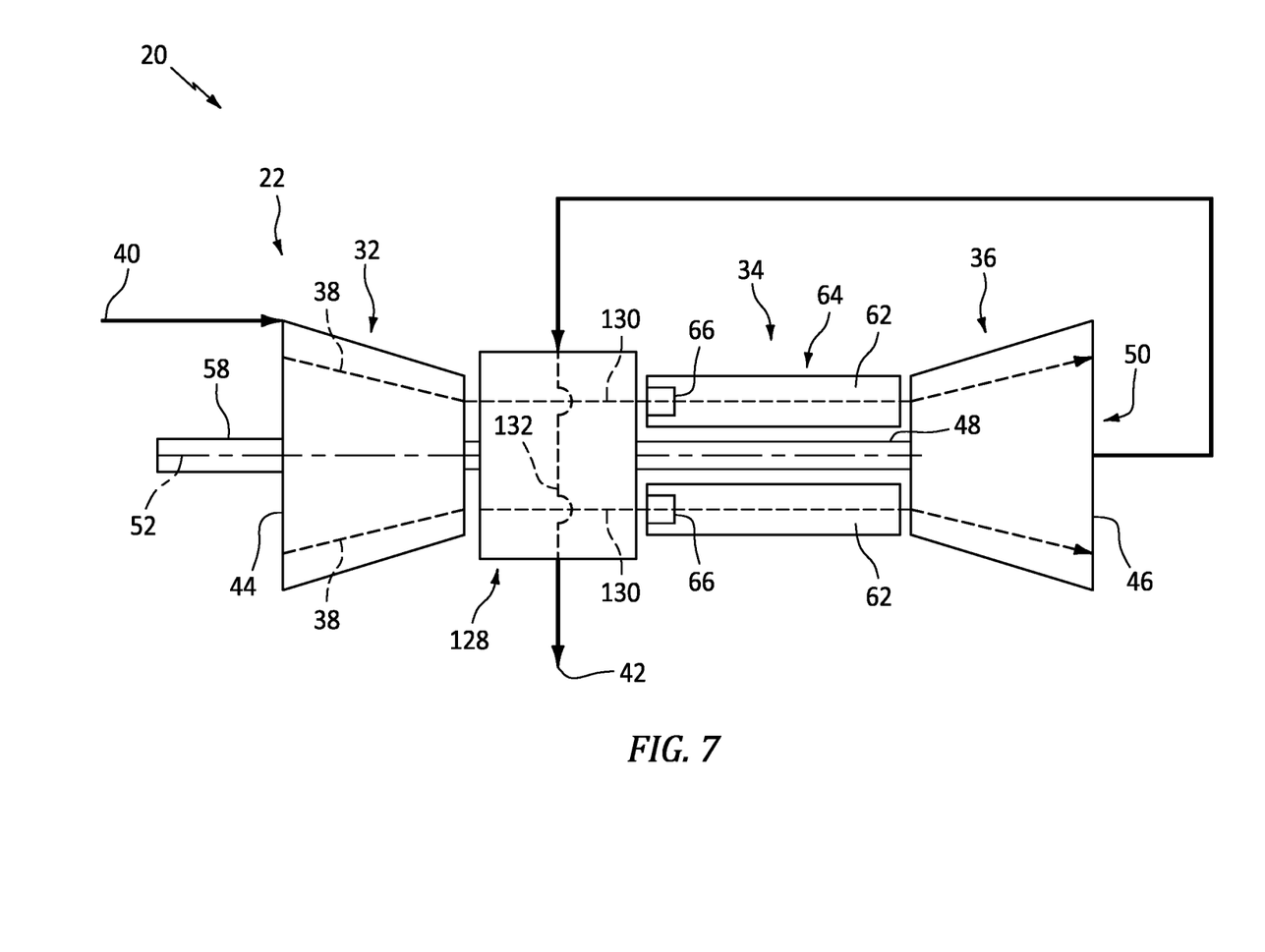
FIG. 7 is a partial schematic illustration of the aircraft system and its gas turbine engine with a recuperator/an intercooler.

In some embodiments, referring to FIG. 7, the gas turbine engine 22 may be configured with a heat exchanger 128 such as a recuperator/an intercooler. The heat exchanger 128 of FIG. 7 includes a first heat exchanger path 130 and a second heat exchanger path 132. The first heat exchanger path 130 is fluidly coupled with and between the compressor section 32 and the combustor section 34. The first heat exchanger path 130 may thereby form a select portion of the engine flowpath 38 between the compressor section 32 and the combustor section 34. The second heat exchanger path 132 is fluidly coupled with and between the turbine section 36 and the combustion products exhaust 42. The second heat exchanger path 132 may thereby form a select portion of the engine flowpath 38 between the turbine section 36 and combustion products exhaust 42. With this arrangement, the heat exchanger 128 may pre-heat the compressed air provided to the combustor section 34 to facilitate more efficient combustion.

In some embodiments, the gas turbine engine 22 and the external compressor(s) 24 may be operated through aircraft operation; e.g., during taxiing, takeoff, climb, cruise, descent and/or landing. Such continuous operation is in contrast to, for example, intermittent operation of a typical auxiliary power unit (APU). However, in other embodiments, the gas turbine engine 22 and/or the external compressor(s) may be selectively operated.

The aircraft system 20 may include various gas turbine engines other than the one described above. The aircraft system 20, for example, may include a geared turbine engine or a direct drive gas turbine engine. The gas turbine engine may include a single spool (e.g., rotating structure) or multiple spools (e.g., rotating structures). The turbine engine may be configured as a turbofan engine, a turbojet engine, a turboprop engine, a turboshaft engine, a propfan engine, a pusher fan engine or any other type of turbine engine. Furthermore, the gas turbine engine may also be configured as a hybrid engine with, for example, one or more electric machines (e.g., electric motors) for selectively driving rotation of the compressor rotor(s) 54 through the gearbox 26. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An aircraft system, comprising:
a gas turbine engine including a compressor section, a turbine section, a combustor section and a rotating structure, the combustor section fluidly coupled with and between the compressor section and the turbine section, and the rotating structure including a compressor section rotor within the compressor section and a turbine section rotor within the turbine section;
an engine flowpath extending sequentially through the compressor section, the combustor section and the turbine section;
a gearbox;
at least one compressor including a compressor rotor rotatably driven by the rotating structure through the gearbox, wherein the gas turbine engine is dedicated to powering the at least one compressor, and the at least one compressor comprises a centrifugal flow compressor; and
a compressor flowpath extending through the at least one compressor to at least one fluid component outside of the gas turbine engine, wherein the compressor flowpath is discrete from the engine flowpath.

2. The aircraft system of claim 1, wherein the gearbox is configured as a constant speed transmission between the rotating structure and the compressor rotor.

3. The aircraft system of claim 1, wherein the gearbox is configured as a variable speed transmission between the rotating structure and the compressor rotor.

4. The aircraft system of claim 1, further comprising a driven rotor rotatably driven by the rotating structure through the gearbox.

5. The aircraft system of claim 4, wherein
the driven rotor is rotatably driven by the rotating structure through the gearbox independent of the compressor rotor; and
the compressor rotor is rotatably driven by the rotating structure through the gearbox independent of the driven rotor.

6. The aircraft system of claim 4, wherein the driven rotor comprises a propulsor rotor.

7. The aircraft system of claim 1, further comprising a second compressor including a second compressor rotor rotatably driven by the rotating structure through the gearbox.

8. The aircraft system of claim 7, wherein
the second compressor rotor is rotatably driven by the rotating structure through the gearbox independent of the compressor rotor; and
the compressor rotor is rotatably driven by the rotating structure through the gearbox independent of the second compressor rotor.

9. The aircraft system of claim 7, wherein
a second compressor flowpath extends through the second compressor and is discrete from the engine flowpath.

10. The aircraft system of claim 1, further comprising:
a heat recovery circuit including a first heat exchanger, a turbine expander, a second heat exchanger and a recovery circuit compressor;
the first heat exchanger arranged downstream of the turbine section.

11. The aircraft system of claim 10, further comprising a driven rotor rotatably driven by a rotor of the turbine expander.

12. The aircraft system of claim 1, further comprising:
a fuel circuit including a fuel source, a heat exchanger and a fuel injector;
the heat exchanger arranged downstream of the turbine section, and the heat exchanger fluidly coupled between the fuel source and the fuel injector; and
the fuel injector arranged within the combustor section.

13. The aircraft system of claim 1, further comprising:
a heat exchanger including a first heat exchanger path and a second heat exchanger path;
the first heat exchanger path fluidly coupled between the compressor section and the combustor section; and
the second heat exchanger path fluidly coupled with and downstream of the turbine section.

14. The aircraft system of claim 1, wherein the gas turbine engine and the at least one compressor are configured for operation throughout aircraft flight.

15. The aircraft system of claim 1, wherein the gas turbine engine and the at least one compressor are configured to receive air from discrete inlets.

16. The aircraft system of claim 1, wherein the at least one fluid component includes at least one nozzle.

17. An aircraft system, comprising:
- a gas turbine engine including a compressor section, a turbine section, a combustor section and a rotating structure, the combustor section fluidly coupled with and between the compressor section and the turbine section, and the rotating structure including a compressor section rotor within the compressor section and a turbine section rotor within the turbine section;
- a gearbox;
- a first compressor including a first compressor rotor rotatably driven by the rotating structure through the gearbox independent of a second compressor rotor; and
- a second compressor including the second compressor rotor rotatably driven by the rotating structure through the gearbox independent of the first compressor rotor;
- wherein the gas turbine engine is configured to power operation of the first compressor and the second compressor at least during aircraft cruise.

18. A method, comprising:
- providing a system for an aircraft;
- the system including a gas turbine engine, a gearbox, a first compressor, and a second compressor;
- the gas turbine engine including a compressor section, a turbine section, a combustor section and a rotating structure, the combustor section fluidly coupled with and between the compressor section and the turbine section, and the rotating structure including a compressor section rotor within the compressor section and a turbine section rotor within the turbine section, wherein the gas turbine engine is dedicated to powering at least the first compressor;
- the first compressor comprising a first compressor rotor rotatably driven by the rotating structure through the gearbox independent of a second compressor rotor;
- the second compressor comprising the second compressor rotor rotatably driven by the rotating structure through the gearbox independent of the first compressor rotor;
- operating the gas turbine engine to drive rotation of the first compressor rotor through the gearbox at least during cruise of the aircraft.

19. The method of claim 18, wherein the gas turbine engine is further operated to drive the rotation of the first compressor rotor through the gearbox during at least one of taxiing of the aircraft, takeoff of the aircraft, climb of the aircraft, descent of the aircraft or landing of the aircraft.

* * * * *